United States Patent
Bai et al.

(10) Patent No.: US 9,037,728 B2
(45) Date of Patent: May 19, 2015

(54) SITUATION-DRIVEN SPONTANEOUS NETWORKING

(75) Inventors: Kun Bai, Elmsford, NY (US); David F. Bantz, Portland, ME (US); Thomas E. Chefalas, Somers, NY (US); Leslie S. Liu, White Plains, NY (US); Steven J. Mastrianni, Unionville, CT (US); James R. Moulic, Poughkeepsie, NY (US); Dennis G. Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/045,957

(22) Filed: Mar. 11, 2011

(65) Prior Publication Data

US 2012/0233336 A1 Sep. 13, 2012

(51) Int. Cl.
*G06F 15/16* (2006.01)
*H04W 8/00* (2009.01)
*H04W 84/18* (2009.01)

(52) U.S. Cl.
CPC .............. *H04W 8/005* (2013.01); *H04W 84/18* (2013.01)

(58) Field of Classification Search
CPC ..... H04W 4/023; H04W 52/28; H04W 84/18; G06F 19/3493; G06F 15/16; G08B 13/1672; G08B 25/10; G08B 25/08; H04L 67/12; H04Q 9/00
USPC .................. 709/227; 704/239; 702/188, 189; 348/E5.037; 367/127; 455/11.1, 13.1, 455/41.2; 701/45
See application file for complete search history.

(56) References Cited

U.S. PATENT DOCUMENTS

| 7,424,352 | B2 | 9/2008 | Matsunaga et al. ............. 701/42 |
| 2008/0140287 | A1* | 6/2008 | Yang et al. ...................... 701/45 |
| 2008/0162133 | A1* | 7/2008 | Couper et al. ................. 704/239 |
| 2008/0165047 | A1* | 7/2008 | Fisher et al. .................... 342/45 |
| 2010/0198513 | A1* | 8/2010 | Zeng et al. ..................... 701/300 |
| 2010/0211359 | A1* | 8/2010 | Mehta ........................... 702/188 |
| 2010/0257251 | A1 | 10/2010 | Mooring et al. .............. 709/216 |
| 2011/0169633 | A1* | 7/2011 | Lauder et al. ............ 340/539.13 |
| 2012/0170412 | A1* | 7/2012 | Calhoun et al. ............... 367/118 |
| 2012/0182837 | A1* | 7/2012 | Calhoun et al. ............... 367/127 |
| 2014/0018097 | A1* | 1/2014 | Goldstein .................. 455/456.1 |

OTHER PUBLICATIONS

"The Peer Discovery Protocol, Chapter 4, pp. 83-124", Brendon J. Wilson, JXTA, New Riders Publishing, 2002.
"Ford Accelerates Intelligent Vehicle Research, Creating 'Talking' Vehicles to Make Roads Safer", http://media.ford.com/article_display.cfm?article_id=33978, Feb. 1, 2011, 4 pgs.
"Situation calculus, Chapter 7, Section 7.6, pp. 204-206", Stuart J. Russell and Peter Norvig, Artificial Intelligence a Modern Approach, 1995, 26 pgs.

* cited by examiner

*Primary Examiner* — Vivek Srivastava
*Assistant Examiner* — Muhammad A Raza
(74) *Attorney, Agent, or Firm* — Harrington & Smith; Louis J. Percello

(57) ABSTRACT

In an exemplary embodiment, a method is disclosed that includes, in an electronic device, forming a hypothesis that a situation exists based on one or more situation definitions and data from one or more sensors accessible by the electronic device. The method includes searching for other electronic devices via one or more network interfaces in the electronic device and establishing a network with one or more other electronic devices found during the searching. The method also includes receiving information from the one or more other electronic devices, the information corresponding to the situation. The method further includes, based at least on the information, modifying the hypothesis that the situation exists. Apparatus and computer readable memory media are also disclosed.

20 Claims, 12 Drawing Sheets

FIG. 3A Situation Table, 310: | Situation ID | Template ID | Network ID | Threshold |

FIG. 3B Template Table, 320: | Template ID | Rule ID | Weight |

FIG. 3C Rule Table, 330: | Rule ID | Sensor | Value Criterion/Criteria |

FIG. 3D Network Table, 340: | Network ID | Network Type | Locality |

Messages, 410

| Message names | Function |
|---|---|
| 410-1 Share request | A message broadcast to all nodes with an expressed interest in sharing situation data. This message initiates a specialized network for data sharing. |
| 410-2 Situation | A message sent to all nodes currently in the sharing network requesting the initiation of a network specific to a given, registered situation. |
| 410-3 End Situation | A message sent to all nodes currently participating in a network specific to a given, registered situation, requesting the termination of that network. |
| 410-4 Status available | A message sent to all nodes currently participating in a network specific to a given, registered situation, advising that the sending node has new status available relevant to that situation. |
| 410-5 Request status | A message sent to a node previously advertising available status, requesting a status message containing the status update. |
| 410-6 Status | A message sent in response to a Request status message containing a status update. |

FIG. 4

FIG. 7A | Shots fired | Percussion + Action | Local Network | 0.5 |

— Situation Table, 810

FIG. 7B | Percussion + Action | Percussion sounds, action | 0.7, 0.3 |

— Template Table, 820

FIG. 7C

| Percussion sounds | Microphone | Sound(s) in certain frequency range whose time profiles of amplitude meet certain criteria |

— Rule Table, 830-1

| Action | Camera | Movement meeting certain criteria (e.g., a lot of movement) |

— Rule Table, 830-2

FIG. 7D | Local network | Transitory | 100 Yards |

— Network Table, 840

FIG. 7E

| Fireworks | Percussion + No Movement + No Action | Local Network | 0.5 |
|---|---|---|---|

— Situation Table, 850

FIG. 7F

| Percussion + No Movement + No Action | Percussion sounds, Movement, Action | 0.6, 0.3, 0.1 |
|---|---|---|

— Template Table, 860

FIG. 7G

| Percussion sounds | Microphone | Sound(s) in certain frequency range whose time profiles of amplitude meet certain criteria |
|---|---|---|

— Rule Table, 870-1

| Movement | GPS | GPS data unchanged over some period |
|---|---|---|

— Rule Table, 870-2

| Action | Camera | Movement meeting certain criteria (e.g., not much movement) |
|---|---|---|

— Rule Table, 870-3

FIG. 7H

| Local network | Transitory | 100 Yards |
|---|---|---|

— Network Table, 840

SITUATION-DRIVEN SPONTANEOUS NETWORKING

BACKGROUND

This invention relates generally to networks, and, more specifically, relates to spontaneous networks.

In current practice, a single network supports all communications among devices in the network. This means that each device must communicate with each other device in order to query whether that device has relevant information, and each device queried has to search its entire store of information in order to respond. Thus locating relevant information is inefficient and cumbersome, especially in the case of some real-world event to which response must be made expeditiously.

SUMMARY

In an exemplary embodiment, a method is disclosed that includes, in an electronic device, forming a hypothesis that a situation exists based on one or more situation definitions and data from one or more sensors accessible by the electronic device. The method includes searching for other electronic devices via one or more network interfaces in the electronic device and establishing a network with one or more other electronic devices found during the searching. The method also includes receiving information from the one or more other electronic devices, the information corresponding to the situation. The method further includes, based at least on the information, modifying the hypothesis that the situation exists. Apparatus and computer readable memory media are also disclosed.

BRIEF DESCRIPTION OF THE SEVERAL VIEWS OF THE DRAWINGS

FIG. 3, including FIGS. 3A-3D, illustrates exemplary tables used for situation hypotheses and stored as situation definitions;

FIG. 4 lists exemplary messages, including exemplary message names and functions, used for communication in situation-driven spontaneous networking;

FIG. 7, including FIGS. 7A-7H, illustrates exemplary tables used for situation hypotheses and stored as situation definitions in the example of FIG. 6;

DETAILED DESCRIPTION

Figure 1:
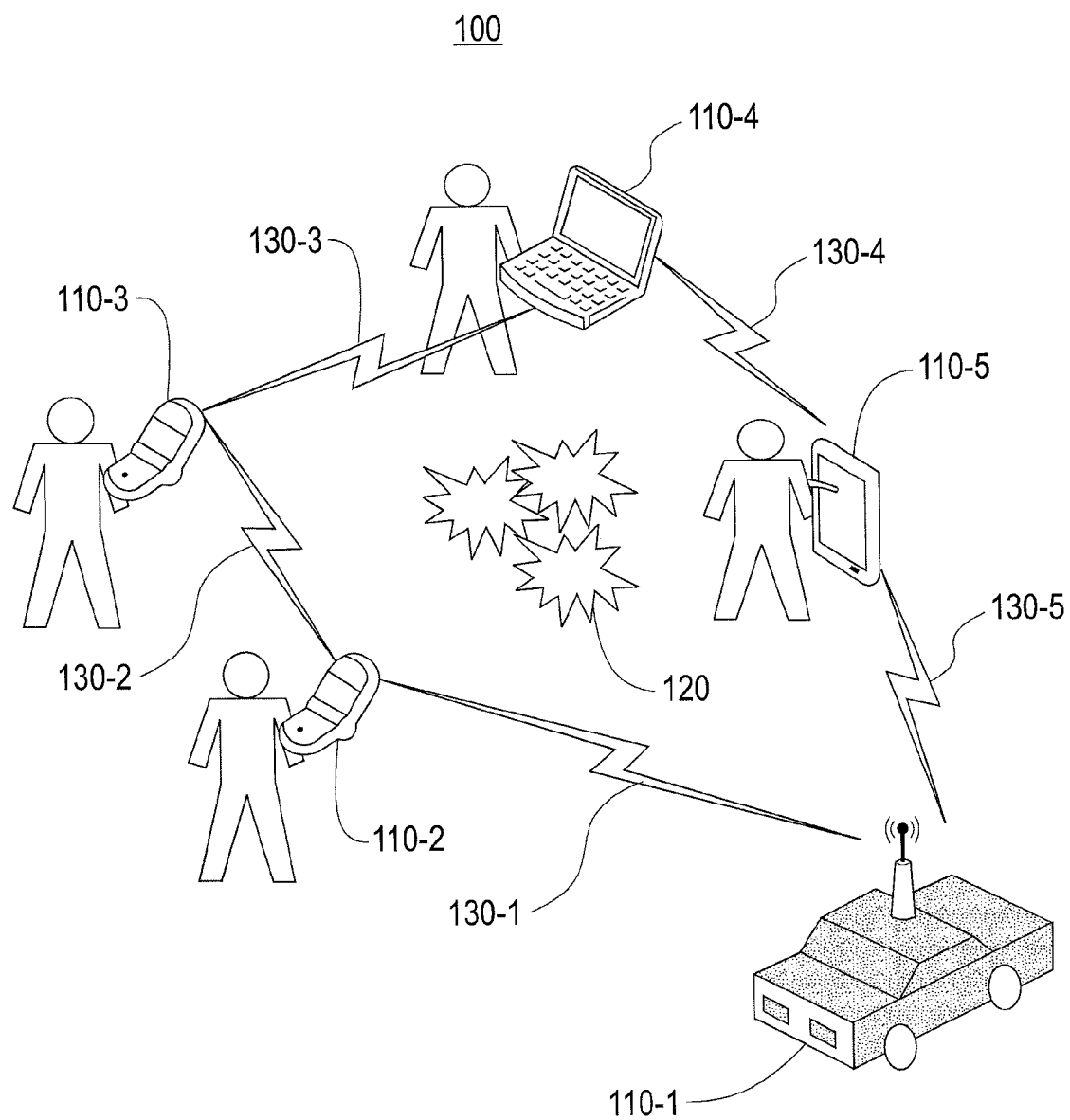
FIG. 1 illustrates the overall configuration of a mobile computing system in which the invention may be practiced.

"Spontaneous," "ad hoc" or "peer-to-peer" networking is well known in the art. One example is the software system JXTA, described in a book "JXTA in a Nutshell", Scott Oaks, Bernard Traversat and Li Gong, O'Reilly Press (2002). JXTA provides functionality that allows a network node to search for a network to join or to dynamically create such a network. The criteria for taking such action are not addressed by JXTA; neither is the information conveyed on the network nor how that information is interpreted.

Situation detection is similarly well-known. An example is U.S. Pat. No. 7,424,352, entitled "Driving situation detection system", which uses a model of vehicle dynamics and detects when the actual movement of a vehicle is not within normal bounds.

Currently, however, there are no techniques for initiation of or joining to a spontaneous network for, e.g., the purposes of gathering additional information, by which a hypothesis that a situation exists can be confirmed, denied or refined.

By contrast, the instant invention relates to techniques for automatic networking of computers, specifically for joining or initiating such a network based upon hypothesizing the existence of one or more situations and for, e.g., exploiting the network to validate and refine the hypothesis.

Exemplary embodiments of the instant invention described herein have special value when the electronic devices participating in the network are mobile, such as being handheld or in vehicles. Mobility implies opportunity and danger because the user is exposed to changing external conditions. The environment (including the users themselves) in which the electronic device is used can be sensed through the use of appropriate sensors. Regarding the environment particular to a user, such environment could include as examples voice-stress analysis, galvanic skin response (e.g., sweating) and other indicators of unusual user state. Given a collection of hypotheses about the environment, the sensor readings can be used to select hypotheses that are likely, but additional information obtained about the environment by other electronic devices can help validate or invalidate a given hypothesis and can help refine the hypothesis. For example, if a sound of gunshots is detected by a single electronic device, then the hypothesis that a gun is firing may be formed, but if that hypothesis is also formed by other electronic device in the vicinity then the hypothesis is more likely to be correct. Another example is the encountering of black ice while driving. One vehicle detects loss of traction and hypothesizes black ice. Vehicles ahead may have already encountered the loss of traction, increasing the likelihood that the hypothesis "black ice" is correct. Vehicles behind can now be notified so that they can form the hypothesis "black ice ahead" and, e.g., potentially inform the vehicle's occupant of this hypothesis and ready the vehicle's traction-control system for the encounter.

The instant invention, then, is directed in an exemplary embodiment to mobile computing in which members have access to a wireless network, sense their environment, and collaborate automatically to detect hypothesized situations. Although it is not a consideration of the present invention to exploit this detection, as action plans can take many and varied forms, the purpose of detecting a situation provides the basis for a choice and particularization of an action plan.

An exemplary goal of an exemplary embodiment of the invention is to automatically increase the certainty or lack thereof of a hypothesized situation through gathering information from other network nodes.

Exemplary embodiments of the invention will now be described. FIG. 1 shows the overall configuration of an exemplary mobile computing network 100 in which the invention may be practiced. In the figure, a number of electronic devices 110 are shown communicating with each other over a wireless network 100. The electronic devices 100 include cell phones 110-2, 110-3, a tablet computer 110-5, a laptop 110-4, and a computer 110-1 in a car. Illustratively, the wireless network 100 is a spontaneous network set up because one of the electronic devices 110 reacted to percussive sounds 120 and spontaneously contacted the other wireless devices 110.

A point to be made here is that the word "network" has at least two meanings in this context. The first meaning is that a capability exists to communicate, in the case of the figure, wirelessly. In this sense a wireless network often allows many devices to communicate, some directly with each other and some only through intermediates. This is typically the case with cellular data networks. Cell phones typically can only communicate with each other through an intermediary, the cell phone service provider. Laptops or tablets can communicate with each other through an intermediary (e.g., an Internet service provider) or directly, through, e.g., wired or Wi-Fi wireless networks.

The second meaning of the word "network," most pertinent here, is that a capability exists for designated software entities within a computer to communicate. The term "application network" is sometimes used in this way. For this to be true a network (in the first sense) must be present. But more is needed. The software entity, typically a process or task, must have an identifier by which the software entity can be distinguished from other such entities. Furthermore, a given software entity may be a party to more than one such network and so a network identifier should be present to allow the entity to distinguish between messages received from different networks.

In the instant description, the term "network" is used in the second sense as a logical connection (perhaps one of many) among software entities, some of which may reside on the same computer and some of which may be reachable only over a network in the first sense. Thus FIG. 1 shows communication among various devices as a collection of point-to-point communication links 130-1 through 130-5, as this form of communication may be the only form supported by the logical connection. This is not a limiting condition of the instant invention: networks can be of the ring topology as shown or may be fully connected (e.g., point-to-point between each electronic device 110) or any variation thereof.

Figure 2:
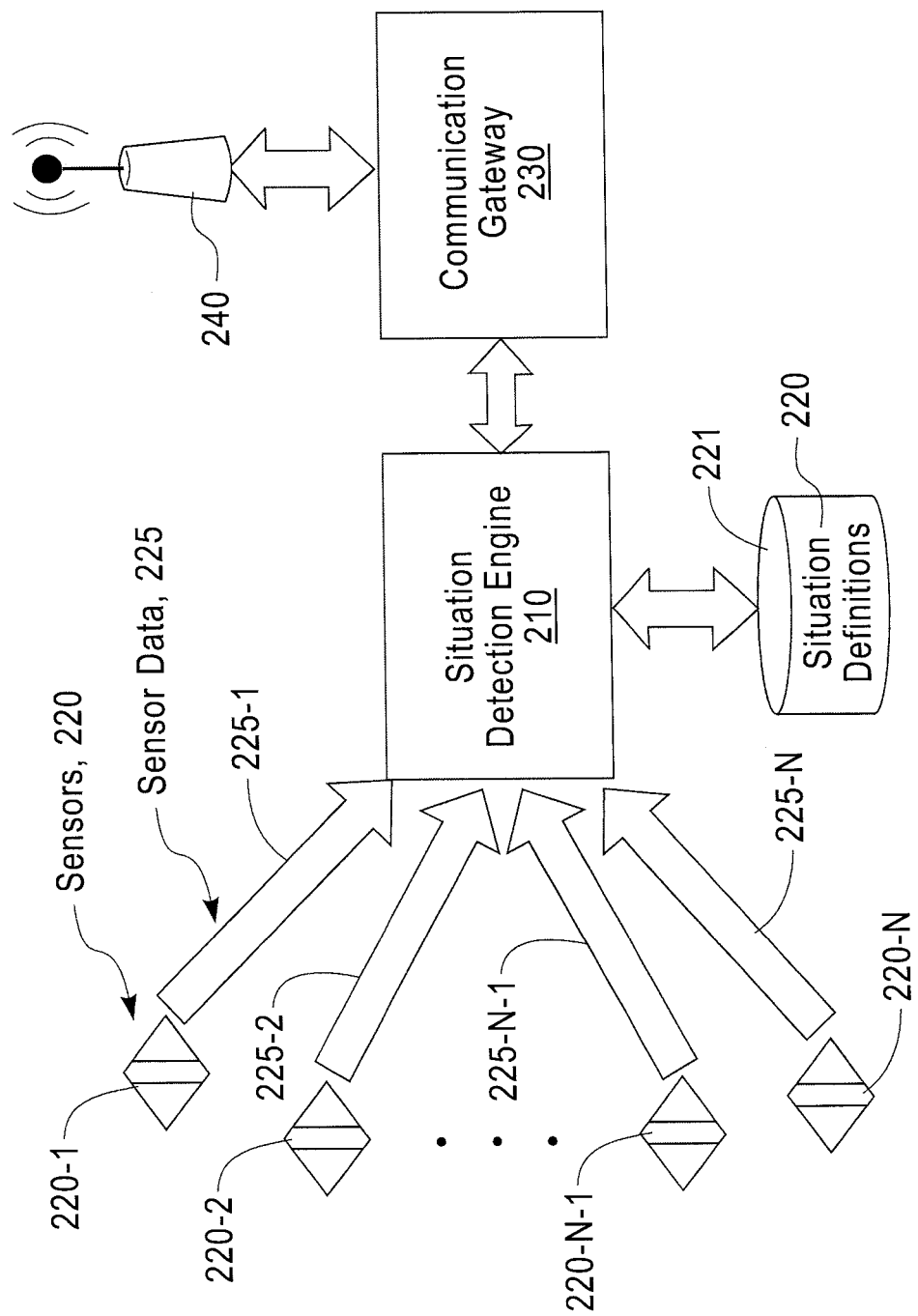
FIG. 2 illustrates exemplary software components of an electronic device.

FIG. 2 shows an internal view of exemplary software components in an electronic device such as one of the electronic devices 110. Three categories of components are shown: sensors 220, a situation detection (SD) engine 210 and a communication gateway (CG) 230. The communication gateway 230 acts as a node on the network 100, sending and receiving messages. The sensors 220-1 through 220-N measure environmental conditions, and the situation detection engine 210 forms hypotheses from the sensor measurements (corresponding to sensor data 225) and from messages the situation detection engine 210 receives via the communication gateway 230. Although not shown in the figure, the situation detection engine 210 may communicate with a given sensor so as to customize the response of the sensor, thus providing increased or more accurate data in response to a hypothesis.

The sensors 220 in the figure should not be interpreted too literally: they may be physical sensors (e.g., a microphone, an accelerometer) or may be instrumentation on other software components in the device. An example of the latter is a "presence detection" sensor that itself hypothesizes the presence or absence of a user, using such information as keyboard, touch sensor and other user input behavior. Another example is a user stress sensor that hypothesizes the level of stress experienced by the user from analysis of his or her speech.

The purpose of the situation detection engine 210 is to classify sensory and network-based inputs, determine which hypotheses these classes apply to, select a subset of hypotheses for testing and refinement and actively solicit additional inputs by establishing (if not already present) a hypothesis-specific network 100. This "establishing" is the act of spontaneous networking. In an exemplary embodiment, the situation detection engine 210 does this by reference to a store of hypothesis templates, shown in the figure stored on a computer readable memory medium 221 (e.g., a hard drive) and identified as situation definitions 220. The terms "situation" and "hypothesis" are used herein interchangeably—the hypothesis is that a given situation exists or does not exist. Note that the non-existence of a situation is potentially as important a hypothesis as its existence—if it can be determined to high probability that no gunshots have been heard in the vicinity of the electronic device 110, the user should be informed and will take appropriate action.

The dialog between the situation detection engine 210 and the communication gateway 230 will be detailed later. For purposes of understanding FIG. 2, however, some messages will be described. One message from the situation detection engine 210 to the communication gateway 230 asks the communication gateway 230 to initiate a network 100 (via, e.g., the antenna 240) specific to a hypothesis that the situation detection engine 210 would like to test and refine. A message from the communication gateway 230 to the situation detection engine 210 carries information received from another node on the network concerning the hypothesis for which the network was formed, possibly providing additional (remote) sensory input. The situation detection engine 210 may also signal the communication gateway 230 to abandon a given network 100, as the hypothesis for which that network was formed may no longer be of interest.

FIG. 3, including FIGS. 3A-3D, illustrates exemplary tables that might be used for situation hypotheses and stored as situation definitions 220. The tables shown in FIG. 3 are used by situation detection engine 210. The situation table 310, shown in FIG. 3A, associates a unique situation ID (identification) with one or more template IDs and network IDs. This permits a given situation to be a composite: the situation can be said to exist if any of the given templates matches the current sensory input. In an example, a threshold is also stored in a situation table 310. However, the threshold may be stored elsewhere. The threshold is used to determine whether a situation (e.g., as indicated by the situation ID) exists, as described in more detail below.

The template table 320, shown in FIG. 3B, associates a unique template ID with one or more rule IDs, each with a corresponding weight. The weights are used to compute the likelihood of a given hypothesis. As can be seen from the rule table 330, shown in FIG. 3C, each rule refers to one or more sensors; a rule triggers when the given sensors have a reading meeting the given value criterion/criteria. Value criteria can express conditions on one or more values, conditions on value changes and more complex conditions.

If a given situation is detected to be likely (e.g., if a situation hypothesis is formed) then the situation table 310 calls for a network with given network ID to be formed. The details of network formation are given in the network table 340, shown in FIG. 3D. Networks are of a certain type (e.g., permanent or transitory) and have a certain locality (e.g., only network with other devices located within 100 yards of the initiating device).

FIG. 4 lists some exemplary messages 410 that flow on the spontaneously-created network 100. The share request message 410-1 is used to initiate a new network to which all nodes with situation hypotheses (or interest therein) join. In an exemplary embodiment, a node has an interest in a given situation hypothesis if the node possesses the ability to hypothesize that situation—if the node has the necessary situation templates. The transmitting node is not aware of this. Usually some form of restricted (e.g., geographically-constrained) broadcast is used to contact candidate nodes. Only those nodes that can form the hypothesis will respond.

In another exemplary embodiment, there is another form of this: a broadcast that asks "does anybody in my vicinity have any sensor data applicable to the hypothesis that I am trying to verify?" Thus the ability of a given node to form the hypothesis is not needed—only the tables that say what sensor data are applicable to a given hypothesis. In yet another embodiment, in addition to or in place of the previously described examples, a broadcast might ask "does anybody in my vicinity have any sensor data?" The latter example might be used when there are nodes that might have data but that might not have any of the tables described herein. Those nodes therefore may not be able to form or modify their own hypothesis, but the node originating the broadcast might find useful data for modifying its own hypothesis. It is noted in the latter example, there could be a benefit in limiting the types of sensor data being requested, e.g., to ensure that data related to the hypothesis is received. For instance, if the hypothesis is "shots fired", then data related to temperature would not be useful.

The network 100 forms the subset of all nodes interested in sharing information about situation hypotheses. The situation message 410-2 is used to initiate a network specific to a given, registered situation. All nodes interested in sharing information about situations contain a situation registry, defined by the values in the tables of FIG. 3 and stored in situation definitions 220. The nodes have a common view of situation definitions 220 and so can share relevant information concerning those situations. Nodes need not have the same situation definitions, but the situational definitions should be related. Otherwise a node may supply sensor values that are not relevant. But different nodes may want different situation definitions, for example because certain nodes have an enhanced set of sensors or more stringent criteria for the situation to be said to exist.

The end situation message 410-3 is used to terminate the network. This is valuable if nodes have limited resources and can benefit from releasing the resources dedicated to the network for reuse. Regarding single nodes, a node could leave the network simply by ceasing to use the network, and by releasing all of the resources the node has dedicated to that network. Because these are peer networks, all of the network resources should come out of the resources of the nodes (e.g., there should be no centralized resources). If no node has any resources allocated to the network, the network ceases to exist. While single nodes could simply cease using a network, the end situation message 410-3 beneficially alerts other nodes to this fact, so that the other nodes may (or may not) also release their resources.

It is noted that there is an embodiment of the invention with centralized resources. In this embodiment, nodes subscribe to a collection of situation tables in a central server. Their subscription corresponds to the establishment of a spontaneous network.

The status available messages 410-4, request status messages 410-5 and status messages 420-6 form the mechanism by which one node obtains information relevant to a given hypothesis from another node. This information may be in terms of sensor readings, triggered rules or an overall conclusion that the given hypothesis is likely or unlikely. After a number of message exchanges, a given node may find that the sum of all of the weights of triggered rules exceeds a threshold, that threshold being indicative of a level of confidence in the hypothesis. This situation can be signaled to other nodes indicating that the sending node is certain that the given situation exists.

Figure 5:
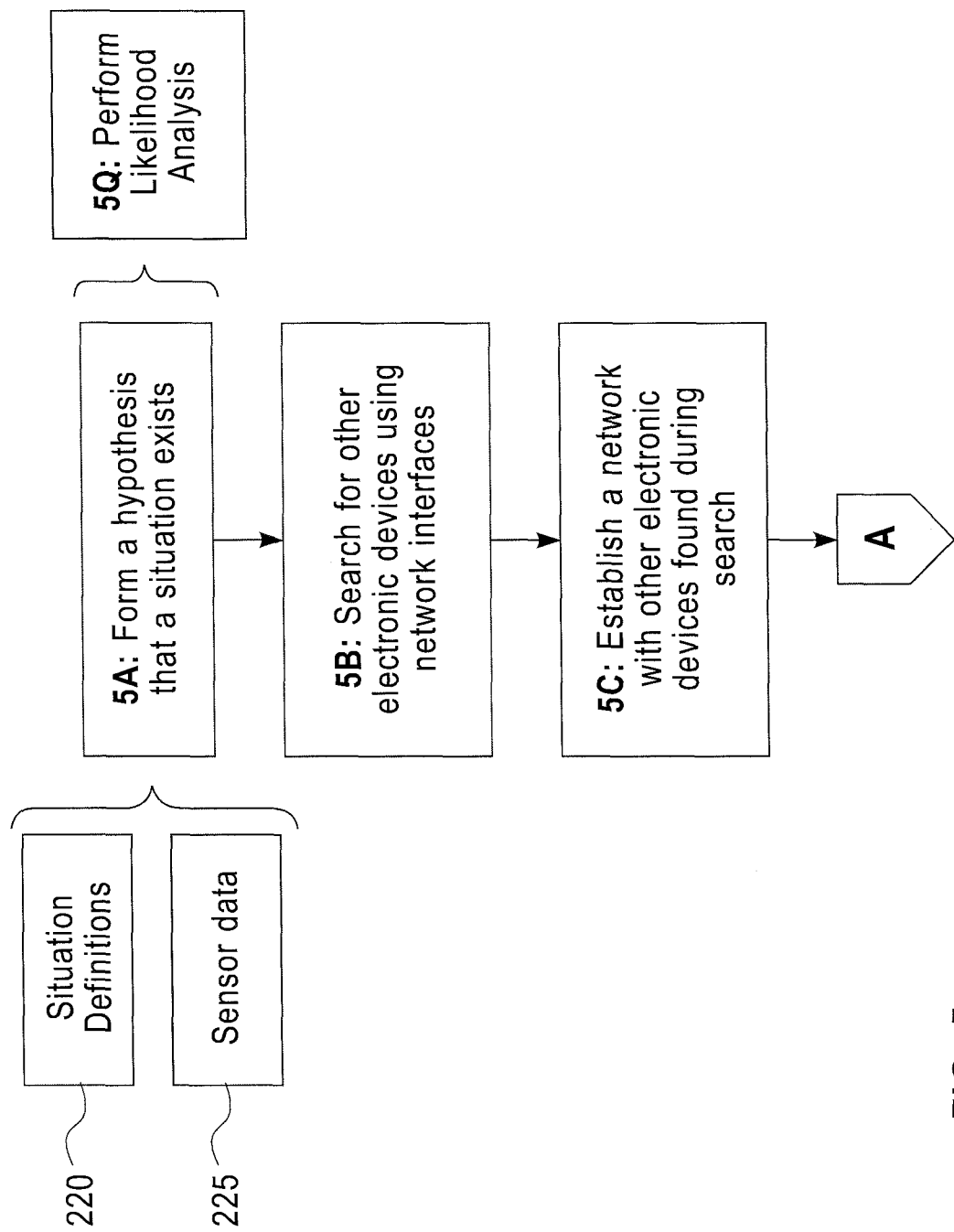
FIG. 5 is a flowchart of an exemplary method for situation-driven spontaneous networking.
Figure 5:
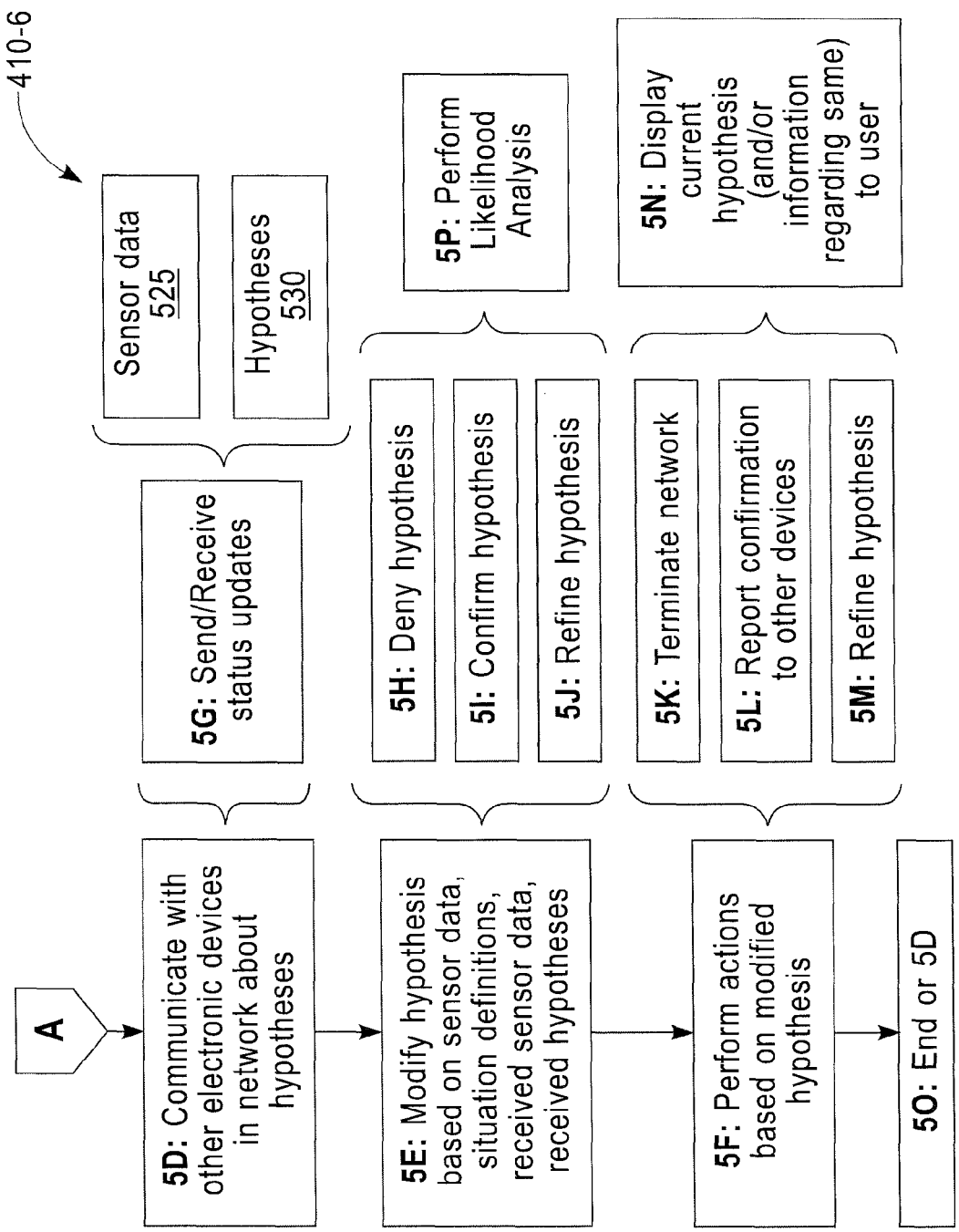

Turning to FIG. 5, a flowchart is shown of an exemplary method for situation-driven spontaneous networking. The blocks in this method may be performed by, e.g., the situation detection engine 210 (as helped by the communication gateway 230). These entities may be entirely software and executed by one or more processors, or portions of the entities may be implemented in hardware (such as an integrated circuit). In block 5A, the situation detection engine 210 forms a hypothesis that a situation exists. The hypothesis is formed using situation definitions 220 and sensor data 225. An example of hypothesis formation is discussed in reference to FIGS. 6 and 7 below. Briefly, hypothesis generation can be thought of as a response to a change in sensor values, or in values received from other devices. When this change occurs and exceeds a threshold, the situation detection engine responds by locating all rules associated with that sensor and evaluating them. The hypothesis is judged to be more likely when the weighted sum of all evaluated rules increases. As this sum passes a series of thresholds (e.g., 'possible', 'probable', 'certain'), the situation detection engine can take various actions. In the early stages of hypothesis testing, say at the stage that the hypothesis likelihood exceeds the 'possible' threshold, the situation engine can then initiate a network to gain further information concerning the hypothesis. One exemplary technique for forming a hypothesis is by performing a likelihood analysis (block 5Q), and examples of performing a likelihood analysis are described below.

In block 5B, the electronic device searches for other electronic devices using network interfaces of the electronic device (see, e.g., FIG. 8 below). One example is the JXTA "advertisement." This is a message containing data that can be sent to other devices to which connectivity exists. The other devices can choose to receive the advertisement, analyze the data in the advertisement, and join or not join the situation-specific network. In block 5C, the electronic device establishes a network with other electronic devices found during the search. Block 5C can include using the share request message 410-1 and situation message 410-2, described above.

In block 5D, the electronic device communicates with other electronic devices in the network about its hypothesis and perhaps hypotheses of the other electronic devices in the network. For instance, status updates may be sent and received (block 5G), and the status updates can be communicated using, e.g., the status available message 410-4, request status message 410-5, and the status message 410-6. The status messages 410-6 may include sensor data 525 from other electronic devices or hypotheses 530 from other electronic devices.

In block 5E, the user equipment modifies its hypothesis based on one or more of sensor data 225, situation definitions 220, received sensor data 525, and received hypotheses 530. Block 5E may entail denying the current hypothesis (block 5H), confirming the current hypothesis (block 5I), or refining the current hypothesis (block 5J). One technique for performing blocks 5H, 5I, and 5J is to perform a likelihood analysis (block 5P) based on the received information and the information used to generate the original hypothesis. Likelihood analyses are described below.

In block 5F, the UE performs one or more actions based on the modified hypothesis. Such actions may include terminating the network (block 5K (e.g., using the end situation message 410-3), reporting the confirmation to the other devices (block 5L) (e.g., using a status message 410-6), or refining the hypothesis (block 5M). An example of a refined hypothesis is given below in reference to FIGS. 6 and 7. A refined hypothesis can be thought of as a hypothesis that is either a generalization or a specialization of a given hypothesis. As an example of a generalized hypothesis, a node may conclude that "percussive sounds have occurred." A specialized hypothesis might be that "gunshots have occurred." One hypothesis can be related to another in many manners known in the art. One common technique is to organize the hypotheses into a hierarchy, or tree structure.

Block 5F may also include displaying the current hypothesis or information regarding the same or both to a user (block 5N). For example, if the network is terminated in block 5K because the original hypothesis of "Shots fired" is determined as being incorrect, the current hypothesis of "No shots were fired" might be displayed to the user in block 5N.

In block 5O, the method ends (e.g., if the network is terminated in block 5K) or the method proceeds to block 5D. Blocks 5D, 5E, and 5F would be performed to deny, confirm, or refine the current hypothesis.

Figure 6:
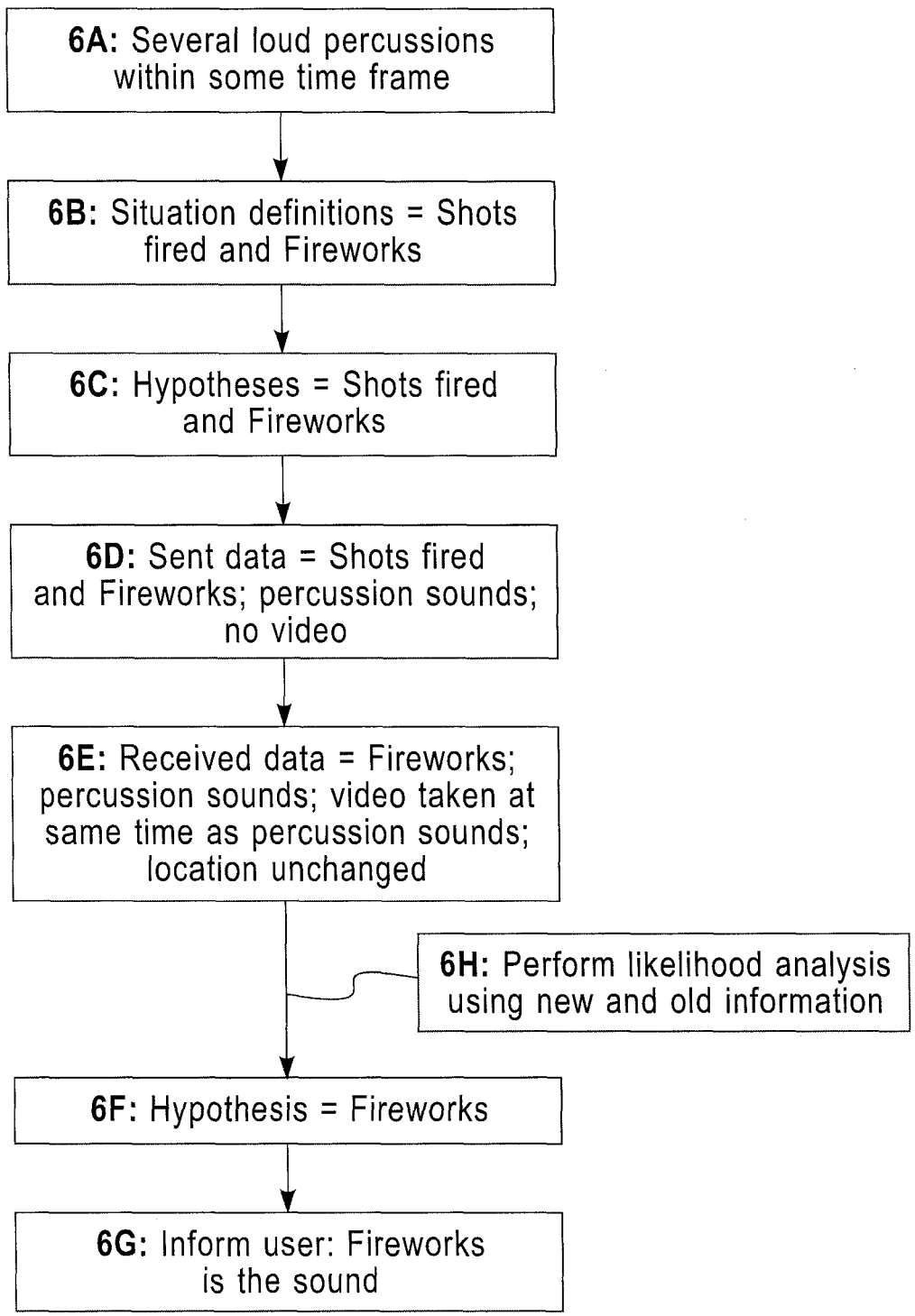
FIG. 6 is a block diagram of an example of the performance of the method of FIG. 5.

An example is helpful at this point to illustrate one simple situation and its "resolution" through one iteration of FIG. 5. In addition to FIG. 5, turn to FIGS. 4, 6, and 7. The example given in FIGS. 6 and 7 is from the viewpoint of one of the electronic devices 110 that records information corresponding to the percussive sounds 120 from FIG. 1. FIG. 6 is a block diagram of an example of the performance of the method of FIG. 5. FIG. 7, including FIGS. 7A-7H, illustrates exemplary tables that might be used for situation hypotheses and stored as situation definitions in the example of FIG. 6. These figures are used to illustrate multiple hypothesis generation and subsequent selection of the most probable hypothesis. In block 6A, several loud percussive sounds 120 are heard near the electronic device 110 within some time frame. That is, sensor data 225 from a microphone (a sensor 220) indicates certain sound data is taken, but sensor data 225 from a camera (a sensor 220) indicates no video is taken. GPS data indicates that the electronic device 110 moves away from an initial location within a certain time period, as might be expected if the electronic device 110 is used by a person walking or in an automobile.

In FIG. 7C, there are two rule tables 830-1, 830-2 that are shown, and these are specific examples of the rule table 330 shown in FIG. 3C. One rule table 830-1 is for percussive sounds (an exemplary rule ID) based on a microphone (the sensor) having data with value criteria of "sound(s) in certain frequency range whose time profiles of amplitude meet certain criteria". The second rule table 830-2 is for action (an exemplary rule ID) for the sensor of a camera having the value criteria of "movement meeting certain criteria".

The template table 820 (a specific example of the template table 320 shown in FIG. 3B) shown in FIG. 7B has an exemplary template ID of "percussion+action" and rule IDs of "percussive sounds" and "action", each corresponding to one of the rule tables 830 shown in FIG. 7C. The weights are 0.7 for "percussive sounds" (rule table 830-1) and 0.3 for "action" (rule table 830-2). In this example, the "action" has a smaller weight because the camera may not be pointed in the correct direction (that is, toward the source of the sounds). However, the microphone should still capture the sound. Also in this example, if the corresponding value criteria are met, a value is assigned to the rule table of one, and if the corresponding value criteria are not met, a value is assigned to the rule table of zero. That is, because there are "sound(s) in certain frequency range whose time profiles of amplitude meet certain criteria", a one is assigned to the rule table 830-1. Meanwhile, because there is no video, a zero is assigned to the rule table 830-2. Thus, an overall value determined using the weights would be 0.7*1+0.3*0 or 0.7.

It is noted that there are a number of different options for representing a joint rule, such as "percussion+action" described previously. A joint rule may also be represented as two rows in the template table, each row with a single sensor and a single weight.

In FIG. 7A, the situation table 810 (a specific example of the situation table 310 shown in FIG. 3A) has a situation ID of "shots fired" and a template ID ("percussion+action") corresponding to the template table shown in FIG. 7B. The network ID is "local network", which is defined by network table 840 shown in FIG. 7D. It is noted that FIG. 7H has the same network table 840 used for the situation table 850 shown in FIG. 7E. The network table 840 is a specific example of the network table 340 shown in FIG. 3D. The network table 840 includes a network ID of "local network", a network type of "transitory", and a locality of "100 yards".

With regard to another hypothesis, for "Fireworks", In FIG. 7G, there are three rule tables 870-1, 870-2, and 870-3 that are shown, and these are specific examples of the rule table 330 shown in FIG. 3C. One rule table 870-1 is for percussive sounds (an exemplary rule ID) based on a microphone (the sensor) having data with value criteria of "sound(s) in certain frequency range whose time profiles of amplitude meet certain criteria". It is noted that the value criteria in FIG. 7G for rule table 870-1 may be different from the value criteria in FIG. 7C for rule table 830-1. The second rule table 870-2 indicates that movement should not occur for fireworks, and the lack of movement is measured by a GPS (the sensor) meeting the value criteria of "GPS data unchanged over some time period". The third rule table 870-3 is for action (an exemplary rule ID) for the sensor of a camera having the value criteria of "movement meeting certain criteria". In rule 830-2, the movement would be a relatively large amount of movement (e.g., because shots were fired), whereas in rule table 870-3, the movement would be small (e.g., because people typically do not run from fireworks).

The template table 860 (a specific example of the template table 320 shown in FIG. 3B) shown in FIG. 7F has an exemplary template ID of "percussion+no movement+no action" and rule IDs of "percussive sounds", "movement" and "action", each corresponding to one of the rule tables 870 shown in FIG. 7G. The weights are 0.6 for "percussive sounds" (rule table 870-1), 0.3 for "movement" (rule table 870-2), and 0.1 for "action" (rule table 870-3). Using the example already given above, an overall value determined using the weights would be 0.6*1 (there were percussive sounds)+0.3*0 (the electronic device is moving)+0.1*0 (the camera is off) or 0.6.

It is noted that the IDs (and the other information in this example) are merely exemplary. The IDs could also be numeric or use other forms of identification or include more complex forms such as references to alphanumeric data.

Based on the tables 810, 820, and 830 and the sensor data 225 (containing a digitized version of the percussive sounds) from the microphone and the sensor data (none, because the camera was not on) from the camera, the situation detection engine 210 can determine that the "percussion+action" template meets at least a certain threshold (e.g., 0.5, as shown in the situation table 810) based upon the overall value of 0.7 as determined above. Therefore the situation table 810 is used to determine that the situation definition is "shots fired" (block 6B). Similarly, the "percussion+no movement+no action" template meets the threshold of 0.5. The situation table 850 is used to determine that the situation definition is "fireworks" (block 6B). Based on this information (and potentially other tables 810-830, not shown), the situation detection engine 210 judges the likelihood of the hypothesis of "shots fired" is "probable" and the likelihood of the hypothesis of "fireworks" is also "probable" (blocks 6C and 5A).

The situation detection engine 210 then requests the communication gateway 230 to search for other electronic devices using network interfaces (block 5B) and to establish a network with other electronic devices found during the search (block 5C). For instance, if the available network uses JXTA then the communication gateway 230 will transmit an advertisement. The situation detection engine 210 uses the network table 840 to request the communication gateway 230 to set up a transitory local network of electronic devices within about 100 yards of the electronic device to start the network formation process. Such limitation to 100 yards may be performed by sending GPS (global positioning system) data to the other electronic devices (e.g., sending via the share request message 410-1 of FIG. 4) and having the other electronic devices determine whether the electronic devices meet this criterion. Another technique is to query the other electronic devices, e.g., in a share request message 410-1, to request their GPS positions and then filter the electronic devices based on their GPS positions. For instance, the situation message 410-2 might be sent only to those electronic devices approximately meeting the 100 yard requirement based on the corresponding GPS positions of the electronic devices. As another example, instead of 100 yards, the locality could be limited to any electronic devices that respond via Bluetooth, which has an inherent limited range. Still other examples are possible.

The situation detection engine 210 communicates with other electronic devices in the network (block 5D). In this example, the situation detection engine 210 requests the communication gateway 230 send information regarding the current hypotheses of "shots fired" and "fireworks" to the electronic devices in the network. This could be performed using the status available message 410-4 (see also FIG. 4) and the status messages 410-6. The sent data in the status messages 410-6 could include the hypothesis of "shot fired" and "fireworks" and the data of "percussive sounds", "no movement", and "no video" (blocks 6D and 5G).

Other electronic devices in the network respond (blocks 6E and 5G) with the hypothesis of "fireworks" and the data of "percussive sounds", "video taken at same time as percussive sounds" and "location unchanged", where "location unchanged" indicates that the location (e.g., via GPS) of the electronic device that took the video did not change during the time the video was taken by the electronic device. This information could all be from the same electronic device or multiple electronic devices in the network. The responses may be communicated, e.g., via the status available message 410-4 and the status message 410-6 (and potentially the request status message 410-5) and are communicated via the communication gateway 230.

Based on the new information and, e.g., the original hypothesis, the situation detection engine 210 refines (blocks 5E and 5J) the original hypothesis of "shots fired" to the current hypothesis of "fireworks" (block 6F). This is because the movement meets the value criteria of "GPS data unchanged over some time period" in rule table 870-2, and therefore, the probability of fireworks increases to at least 0.8, as the overall value determined using the weights would be 0.6*1 (there were percussive sounds)+0.3*1 (no movement detected based on data from other devices), or at least 0.9. The probability (0.9) of "fireworks" is therefore greater than the probability (0.7) of "shots fired". The latter also is an example of hypothesis refinement from the general to the specific. One such technique for refining the hypothesis is to perform a likelihood analysis using the received (e.g., "new") information and the "old" information (e.g., from the tables 810, 820, 830, 850, 860, and 870) (block 6H). As previously described, "shots fired" from the situation table 810 could be compared with the "fireworks" hypothesis received from the other electronic device and, e.g., whichever is or has been assigned a higher probability would be selected as the most likely. The situation detection engine then causes (in an exemplary embodiment) the user to be informed in block 6G (and block 5N) that "fireworks is the sound".

Figure 8:
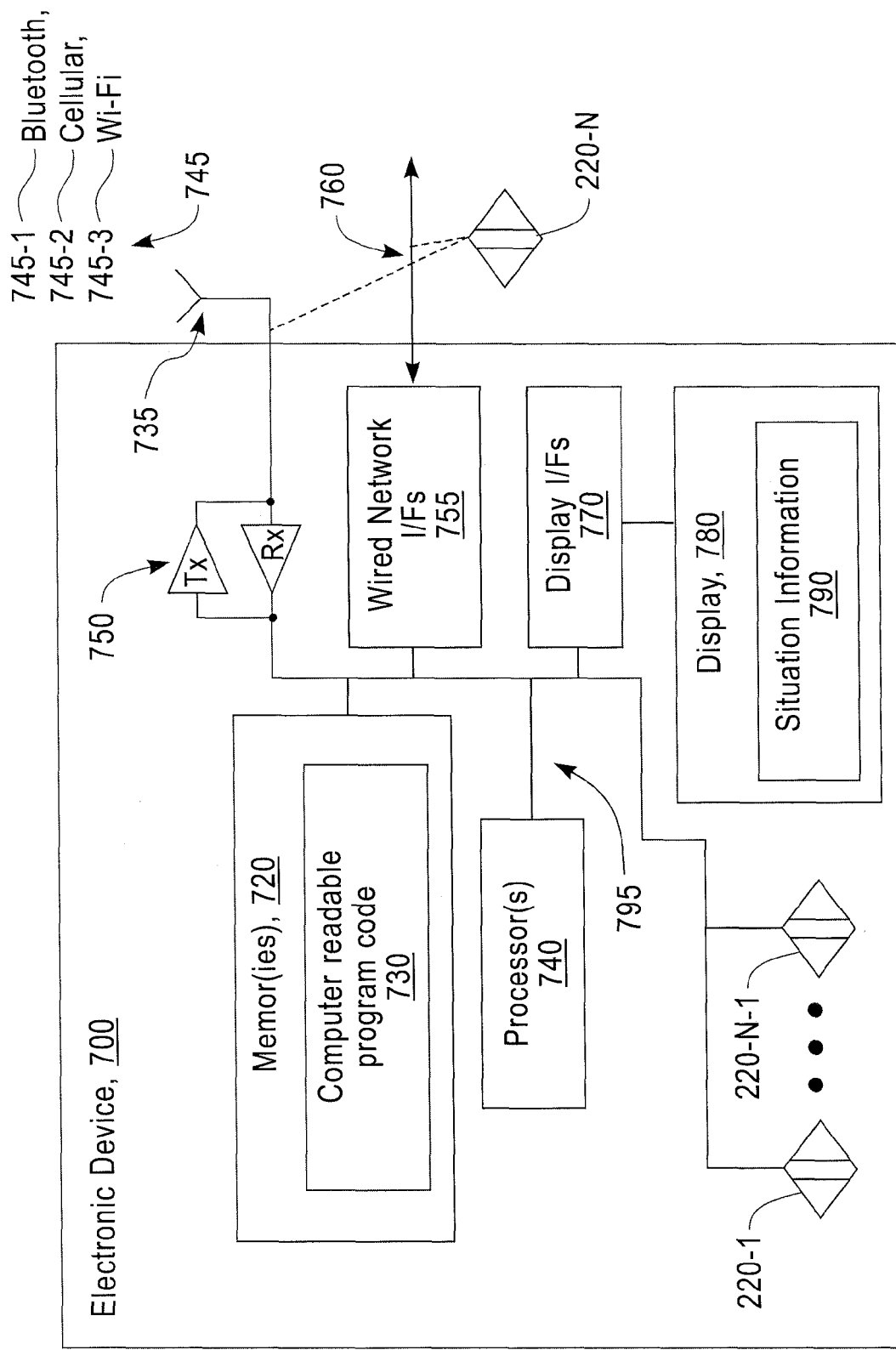
FIG. 8 is a block diagram of an exemplary electronic device suitable for performing the instant invention.

Referring to FIG. 8, a block diagram is shown of an exemplary electronic device 700 suitable for performing the instant invention. The electronic device 700 is an example of an electronic device 110 from FIG. 1. The electronic device 700 includes one or more memories 720, one or more transceivers 750 coupled to one or more antennas 735, one or more wired network interfaces 755, one or more display interfaces 770, one or more processors 740, and N-1 sensors 220-1 thru 220-N-1, all interconnected through one or more buses 795. The one or more antennas 735 may be internal or external to the electronic device 700.

In this example, the situation detection engine 210 and communication gateway 230 are implemented as computer readable program code 730 in the one or more memories 720 (e.g., as a computer program product). The one or more transceivers 750 communicate via wireless links 745, such as through a Bluetooth (a short range wireless connectivity standard) link 745-1, a cellular link 745-2, and/or Wi-Fi (wireless fidelity, a wireless networking technology) 745-3. The one or more wired network interfaces 755 communicate over one or more wired links 760.

The sensors 220 are mainly internal to the electronic device 700. However, sensor 220-N is external to the electronic device 700. The sensor 220-N may communicate via a wired link 760 or a wireless link 745 (e.g., Bluetooth 745-1). For instance, the electronic device 200 may be a cellular phone in an automobile that has a Bluetooth interface and that will transfer certain sensor data 225 over the Bluetooth interface.

In an exemplary embodiment, the electronic device 700 includes a display 780. A display interface 770 drives the display 780 and places situation information 790 on the display 780. Such situation information 790 can include, e.g., indications of hypotheses, current status of communicating based on the hypotheses, and network information.

Figure 9:
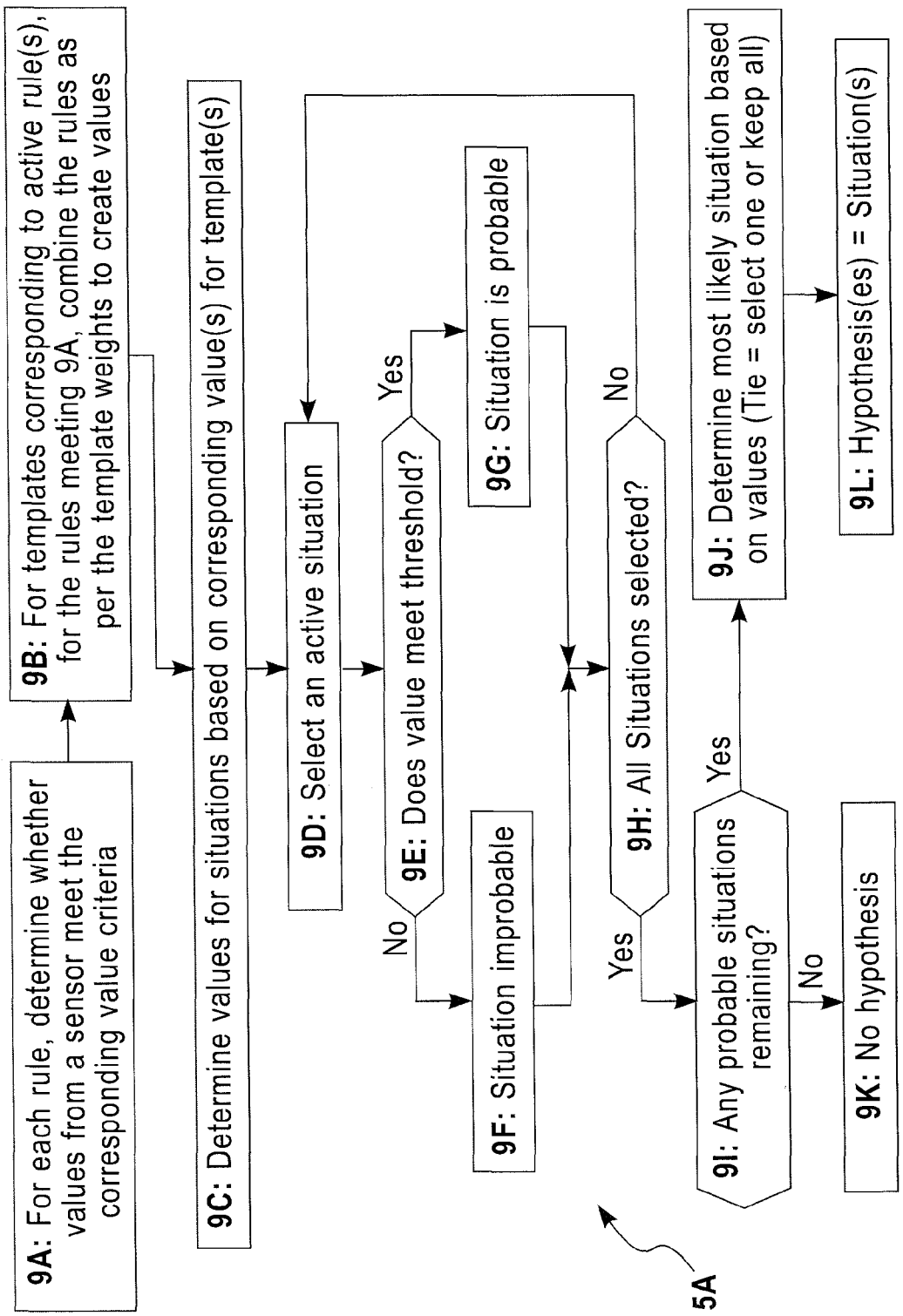
FIG. 9 is a flowchart of an exemplary method for hypothesis identification from local sensor data.
Figure 10:
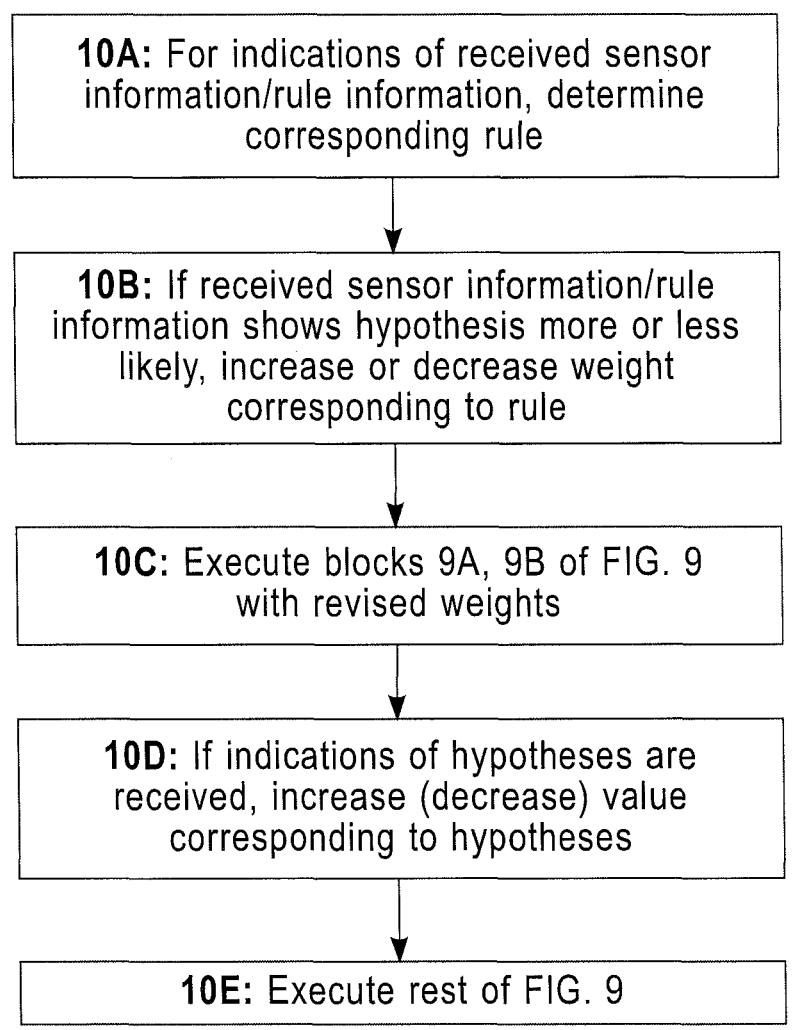
FIG. 10 is flowchart of an exemplary method for modifying a hypotheses based on received data.

Although FIGS. 6 and 7 were previously used to provide an overview of exemplary techniques for forming a hypothesis that a situation exists (block 5A of FIG. 5) and for modifying the hypothesis based on certain information (block 5E), FIGS. 9 and 10, respectively, illustrate this in more detail and relative to a likelihood analysis. FIGS. 9 and 10 are performed by, e.g., a situation detection engine 210 (e.g., as part of computer readable program code 730 executed by the one or more processors 740).

Turning to FIG. 9 in addition to the previous figures, a flowchart is shown of an exemplary method for hypothesis identification from local sensor data (block 5A). FIG. 9 begins in block 9A, where, for each rule, a determination is made whether values from a sensor meet the corresponding value criteria. Such rules may be stored in, e.g., rule tables 330 shown in FIG. 3C. In block 9B, for templates corresponding to active rule(s), for the rules meeting block 9A, combine the rules as per the template weights to create values. Such templates may be stored in the template tables 320 shown in FIG. 3B. An active rule is a rule where the sensor values meet the corresponding value criteria for the rule. Inactive rules are, in an exemplary embodiment, ignored when combining weights as per the template. That is, in the example of the template table 820 of FIG. 8, the rule corresponding to the rule table 830-2 will be given no weight since the rule is inactive. This is similar to the previous example, where the rule corresponding to the rule table 830-2 was given a value of zero prior to multiplying by the weight of 0.3. The value determined in block 9B is the value of the corresponding template, which in the example of FIG. 7B was 0.7*1+0.3*0 or 0.7. Such a value is transferred to the corresponding situation in block 9C. In the example of the situation table 310 in FIG. 3A, a situation is identified based on a single template. However, this is merely exemplary, and there could be cases where a situation is identified based on multiple templates, and the multiple templates may be combined in any way (such as having weights assigned and applied to each template).

In block 9D, an active situation is selected. An active situation is a situation having an assigned value. In block 9E, it is determined if the value meets threshold. If so (block 9E=YES), in block 9G, the situation is deemed to be probable. If not (block 9E=NO), the situation is deemed to be improbable (block 9F). In block 9H, it is determined if all active situations have been selected. If not (block 9H=NO), the method continues in block 9D. If so (block 9H=YES), the method continues in block 9I. If there are any probable situations remaining (block 9I=YES), then the most likely situation is determined (block 9J) based on the values assigned the active situations. In the event of a tie, it is possible to select a single situation or to select all situations. A number of different techniques may be used to determine the best situation from a tie, such as determining how many rules contribute to a score for a situation (e.g., the best situation has more rules that contribute to a score), randomly (e.g., since each is equally probable), and the like. In block 9L, the hypothesis/hypotheses are formed corresponding to the probable situation(s).

If there are no probable situations remaining (block 9I=NO), then in block 9K, no hypothesis is formed. It is noted that only one threshold is shown in FIG. 9, but multiple thresholds could be used to enable division into multiple probability categories, e.g., "very improbable", "improbable", "probable", and "very probable".

FIG. 10 is flowchart of an exemplary method for modifying hypotheses based on received data (block 5E). It is noted that the method shown in FIG. 9 may also be used for modifying a hypothesis (block 5E), with the modifications shown in FIG. 10. This is described below. In block 10A, for received sensor information or rule information, a corresponding rule, e.g., as in a rule table 330, is determined. Thus, actual sensor information (e.g., temperature) may be received. For situations where the sensor information might, e.g., take too much bandwidth, an indication of the corresponding sensor information or rule might be received. For instance, an indication of "sound(s) in certain frequency range whose time profiles of amplitude meet certain criteria" might be received, or an indication of "percussive sounds" might be received.

In block 10B, if the received sensor information/rule information shows an hypothesis to be more or less likely, then the weights corresponding to the rule are increased or decreased. That is, in the example of FIG. 7C and rule table 830-1, if an indication of "percussive sounds" is received, then the weight (0.7) in the template table 820 corresponding to the rule in rule table 830-1 could be increased, e.g., to 0.75, 0.8, 0.9, etc. In block 10C, blocks 9A, 9B of FIG. 9 are performed.

In block 10D, if indications of hypotheses are received, values corresponding to the hypotheses are increased. For instance, if an indication of "shots fired" is received, in situation table 810, there is only one template ID of "percussion+ action", which is assumed to have a value of the corresponding rules (in the example of FIG. 7, 0.7*1+0.3*0 or 0.7). This value of 0.7 could be increased, e.g., by multiplying by 1.2, to determine a value of 0.84. It is also noted that this block could result in a decrease in probability, as "shots fired is less probable" could be received, and, e.g., the value of 0.7 could be multiplied by 0.8 to determine a value of 0.56. The rest of the method of FIG. 9 is executed based on the revised weights (block 10E). FIG. 9 therefore provides for denying a hypothesis (block 5H; block 9K for a single hypothesis or block 9L, where a previous hypothesis is no longer considered probable), confirming a hypothesis (block 5I; block 9L is the same hypothesis, with a higher probability), or refining a hypothesis (block 5J; block 9L is a "different" hypothesis).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    forming a hypothesis to explain an event detected by a sensor, in a mobile electronic device having at least one sensor associated therewith and accessible thereto, that a situation exists based on at least one situation definition and data from said at least one sensor, said at least one situation definition being selected from a store of hypothesis templates in said mobile electronic device and responsive to said data from said at least one sensor, said hypothesis templates relating said data from at least one sensor to possible causes;
    searching by the mobile electronic device for other mobile electronic devices to gather additional information related to said hypothesis via one or more network interfaces in the mobile electronic device;
    establishing a spontaneous mobile network with at least one other mobile electronic device found during the searching, said spontaneous mobile network being established when the mobile electronic device contacts the at least one other mobile electronic device at least having a sensor for detecting the event;
    communicating directly with the at least one other mobile electronic device in the spontaneous mobile network to request the additional information applicable to said hypothesis;
    receiving by the mobile electronic device the additional information from the at least one other mobile electronic device, the additional information corresponding to the situation; and
    based at least on the received additional information, modifying the hypothesis that the situation exists,
    wherein the at least one situation definition comprises:
        one or more rules, each rule relating one or more of the at least one sensor to one or more value criteria, each of the one or more rules being triggered when one or more of the at least one sensor provides data meeting a preselected value criterion; and
        one or more templates, each template relating one or more of the rules to a weight to be applied to a corresponding rule, and
    wherein modifying the hypothesis that the situation exists further comprises:
        determining whether, for each of the one or more rules, one or more values of a corresponding sensor meet corresponding value criteria, wherein the one or more values include any received additional information corresponding to values of a sensor and any values of a corresponding sensor accessible by the mobile electronic device;
        when the received additional information corresponds to a rule, modifying weights corresponding to the rule wherein weights are increased in response to a situation corresponding to the rule being more probable and are decreased in response to the corresponding situation being less probable;
        for each template, for the rules in the template meeting the corresponding value criteria, applying corresponding weights to the rules and determining from the corresponding weights a value for the template;
        when the received additional information corresponds to the hypothesis, modifying values for templates corresponding to the hypothesis to increase values for the hypothesis being more probable according to the received additional information and to decrease values for the hypothesis being less probable per the received additional information; and in response to a value of any of the templates meeting a threshold value, forming the hypothesis that the situation exists because the situation corresponds to a template meeting the threshold value.

2. The method of claim 1, further comprising:
performing one or more actions based on the modifying the hypothesis that the situation exists.

3. The method of claim 1, wherein:
modifying the hypothesis that the situation exists further comprises performing a likelihood analysis based on one or more of the received additional information, the at least one situation definition, and the data from the at least one sensor.

4. The method of claim 3, wherein the likelihood analysis determines one of the following:
confirming the hypothesis that the situation exists because the hypothesis is deemed sufficiently probable;
denying the hypothesis that the situation exists because the hypothesis is deemed sufficiently improbable; or
refining the hypothesis that the situation exists because a refined hypothesis is deemed more probable as determined by the likelihood analysis than is an original hypothesis.

5. The method of claim 1, wherein:
the establishing of the spontaneous mobile network is limited to those other mobile electronic devices found during the searching that are determined to meet a predetermined criterion.

6. The method of claim 1, wherein forming a hypothesis that a situation exists further comprises:
determining whether, for each of the one or more rules, one or more values of a corresponding sensor meet corresponding value criteria;
for each template, for the rules in the template meeting the corresponding value criteria, applying corresponding weights to the rules and determining from the corresponding weights a value for the template;
in response to a value of any of the templates meeting a threshold value, forming the hypothesis that the situation exists because the situation corresponds to a template meeting the threshold value.

7. The method of claim 1, wherein:
forming a hypothesis that a situation exists further comprises forming a plurality of hypotheses, each of the hypotheses being that a corresponding situation exists;
receiving additional information further comprises receiving additional information from the at least one other mobile electronic device, the additional information corresponding to one or more of the plurality of situations; and
based at least on the additional information, for each of one or more hypotheses corresponding to the one or more situations, modifying the hypothesis that the corresponding situation exists.

8. A mobile electronic device comprising:
one or more network interfaces for bidirectional communication;
one or more memories comprising computer readable program code; and
one or more processors, the one or more processors configured, in response to execution of the computer readable program code, to cause the mobile electronic device to perform the following:

forming a hypothesis to explain an event detected by a sensor that a situation exists based on at least one situation definition and data from said at least one sensor associated with and accessible by said mobile electronic device, said at least one situation definition being selected from a store of hypothesis templates in said mobile electronic device responsive to said data from said at least one sensor, said hypothesis templates relating said data from at least one sensor to possible causes;
searching for other mobile electronic devices to gather additional information related to said hypothesis via the one or more network interfaces;
establishing a spontaneous mobile network with at least one other mobile electronic device found during the searching, said spontaneous mobile network being established when the mobile electronic device contacts the at least one other mobile electronic device at least having a sensor for detecting the event;
communicating directly with the at least one other mobile electronic device in the spontaneous mobile network to request the additional information applicable to said hypothesis;
receiving the additional information via the one or more network interfaces from the at least one other mobile electronic device, the additional information corresponding to the situation; and
based at least on the received additional information, modifying the hypothesis that the situation exists,
wherein the at least one situation definition comprises:
one or more rules, each rule relating one or more of the at least one sensor to one or more value criteria, each of the one or more rules being triggered when one or more of the at least one sensor provides data meeting a preselected value criterion; and
one or more templates, each template relating one or more of the rules to a weight to be applied to a corresponding rule, and
wherein modifying the hypothesis that the situation exists further comprises:
determining whether, for each of the one or more rules, one or more values of a corresponding sensor meet corresponding value criteria, wherein the one or more values include any received additional information corresponding to values of a sensor and any values of a corresponding sensor accessible by the mobile electronic device;
when the received additional information corresponds to a rule, modifying weights corresponding to the rule wherein weights are increased in response to a situation corresponding to the rule being more probable and are decreased in response to the corresponding situation being less probable;
for each template, for the rules in the template meeting the corresponding value criteria, applying corresponding weights to the rules and determining from the corresponding weights a value for the template;
when the received additional information corresponds to the hypothesis, modifying values for templates corresponding to the hypothesis to increase values for the hypothesis being more probable according to the received additional information and to decrease values for the hypothesis being less probable per the received additional information; and
in response to a value of any of the templates meeting a threshold value, forming the hypothesis that the situation exists because the situation corresponds to a template meeting the threshold value.

9. The mobile electronic device of claim 8, wherein the one or more processors are further configured, in response to execution of the computer readable program code, to cause the mobile electronic device to perform the following:
performing one or more actions based on the modifying the hypothesis that the situation exists.

10. The mobile electronic device of claim 8, wherein:
modifying the hypothesis that the situation exists further comprises performing a likelihood analysis based on one or more of the received additional information, the at least one situation definition, and the data from the at least one sensor.

11. The mobile electronic device of claim 10, wherein the likelihood analysis determines one of the following:
confirming the hypothesis that the situation exists because the hypothesis is deemed sufficiently probable;
denying the hypothesis that the situation exists because the hypothesis is deemed sufficiently improbable; or
refining the hypothesis that the situation exists because a refined hypothesis is deemed more probable as determined by the likelihood analysis than is an original hypothesis.

12. The mobile electronic device of claim 8, wherein:
the establishing of the spontaneous mobile network is limited to those other mobile electronic devices found during the searching that are determined to meet a predetermined criterion.

13. The mobile electronic device of claim 8, wherein forming a hypothesis that a situation exists further comprises:
determining whether, for each of the one or more rules, one or more values of a corresponding sensor meet corresponding value criteria;
for each template, for the rules in the template meeting the corresponding value criteria, applying corresponding weights to the rules and determining from the corresponding weights a value for the template;
in response to a value of any of the templates meeting a threshold value, forming the hypothesis that the situation exists because the situation corresponds to a template meeting the threshold value.

14. The mobile electronic device of claim 8, wherein:
forming a hypothesis that a situation exists further comprises forming a plurality of hypotheses, each of the hypotheses being that a corresponding situation exists;
receiving additional information further comprises receiving additional information from the at least one other mobile electronic device, the additional information corresponding to one or more of the plurality of situations; and
based at least on the additional information, for each of one or more hypotheses corresponding to the one or more situations, modifying the hypothesis that the corresponding situation exists.

15. A non-transitory computer readable memory medium comprising computer readable program code, which when executed by one or more processors of a mobile electronic device, said mobile electronic device having at least one sensor associated therewith, said at least one sensor being accessible by said mobile electronic device, causes the mobile electronic device to perform at least the following:
forming a hypothesis to explain an event detected by a sensor that a situation exists based on at least one situation definition and data from said at least one sensor, said at least one situation definition being selected from a store of hypothesis templates in said mobile electronic device responsive to said data from said at least one sensor, said hypothesis templates relating said data from at least one sensor to possible causes;
searching for other mobile electronic devices to gather additional information related to said hypothesis via the one or more network interfaces;
establishing a spontaneous mobile network with at least one other mobile electronic device found during the searching, said spontaneous mobile network being established when the mobile electronic device contacts the at least one other mobile electronic device at least having a sensor for detecting the event;
communicating directly with the at least one other mobile electronic device in the spontaneous mobile network to request the additional information applicable to said hypothesis;
receiving the additional information via the one or more network interfaces from the at least one other mobile electronic device, the additional information corresponding to the situation; and
based at least on the received additional information, modifying the hypothesis that the situation exists,
wherein the at least one situation definition comprises:
one or more rules, each rule relating one or more of the at least one sensors to one or more value criteria, each of the one or more rules being triggered when one or more of the at least one sensor provides data meeting a preselected value criterion; and
one or more templates, each template relating one or more of the rules to a weight to be applied to a corresponding rule, and
wherein modifying the hypothesis that the situation exists further comprises:
determining whether, for each of the one or more rules, one or more values of a corresponding sensor meet corresponding value criteria, wherein the one or more values include any received additional information corresponding to values of a sensor and any values of a corresponding sensor accessible by the mobile electronic device;
when the received additional information corresponds to a rule, modifying weights corresponding to the rule wherein weights are increased in response to a situation corresponding to the rule being more probable and are decreased in response to the corresponding situation being less probable;
for each template, for the rules in the template meeting the corresponding value criteria, applying corresponding weights to the rules and determining from the corresponding weights a value for the template;
when the received additional information corresponds to the hypothesis, modifying values for templates corresponding to the hypothesis to increase values for the hypothesis being more probable according to the received additional information and to decrease values for the hypothesis being less probable per the received additional information; and
in response to a value of any of the templates meeting a threshold value, forming the hypothesis that the situation exists because the situation corresponds to a template meeting the threshold value.

16. The non-transitory computer readable memory medium of claim 15, wherein the computer readable program code is further configured, when executed by the one or more processors of the mobile electronic device, causes the mobile electronic device to perform at least the following:
performing one or more actions based on the modifying the hypothesis that the situation exists.

17. The non-transitory computer readable memory medium of claim 15, wherein:
  modifying the hypothesis that the situation exists further comprises performing a likelihood analysis based on one or more of the received additional information, the at least one situation definition, and the data from the at least one sensor.

18. The non-transitory computer readable memory medium of claim 17, wherein the likelihood analysis determines one of the following:
  confirming the hypothesis that the situation exists because the hypothesis is deemed sufficiently probable;
  denying the hypothesis that the situation exists because the hypothesis is deemed sufficiently improbable; or
  refining the hypothesis that the situation exists because a refined hypothesis is deemed more probable as determined by the likelihood analysis than is an original hypothesis.

19. The non-transitory computer readable memory medium of claim 15, wherein:
  the establishing of the spontaneous mobile network is limited to those other mobile electronic devices found during the searching that are determined to meet a predetermined criterion.

20. The non-transitory computer readable memory medium of claim 15, wherein:
  forming a hypothesis that a situation exists further comprises forming a plurality of hypotheses, each of the hypotheses being that a corresponding situation exists;
  receiving additional information further comprises receiving additional information from the at least one other mobile electronic device, the additional information corresponding to one or more of the plurality of situations; and
  based at least on the additional information, for each of one or more hypotheses corresponding to the one or more situations, modifying the hypothesis that the corresponding situation exists.

* * * * *